United States Patent
Chao et al.

(10) Patent No.: US 10,732,709 B1
(45) Date of Patent: Aug. 4, 2020

(54) INTERFEROMETRIC STRUCTURED LIGHT DEPTH SENSING FOR EYE TRACKING

(71) Applicant: Oculus VR, LLC, Menlo Park, CA (US)

(72) Inventors: Qing Chao, Bellevue, WA (US); Michael Hall, Seattle, WA (US)

(73) Assignee: FACEBOOK TECHNOLOGIES, INC., Menlo Park, CA (US)

( * ) Notice: Subject to any disclaimer, the term of this patent is extended or adjusted under 35 U.S.C. 154(b) by 0 days.

(21) Appl. No.: 16/005,509

(22) Filed: Jun. 11, 2018

Related U.S. Application Data

(60) Provisional application No. 62/598,393, filed on Dec. 13, 2017.

(51) Int. Cl.
*G06F 3/01* (2006.01)
*G06K 9/00* (2006.01)

(52) U.S. Cl.
CPC ......... *G06F 3/013* (2013.01); *G06K 9/00604* (2013.01)

(58) Field of Classification Search
USPC .................................................. 345/156, 690
See application file for complete search history.

(56) References Cited

U.S. PATENT DOCUMENTS

| 10,175,489 B1 * | 1/2019 | Robbins .................. G01S 17/46 |
| 10,410,373 B1 | 9/2019 | Hall et al. |
| 10,412,371 B1 | 9/2019 | Chao et al. |
| 2019/0011705 A1 * | 1/2019 | Robbins .................. G01S 17/46 |
| 2019/0171020 A1 * | 6/2019 | Robbins .................. G01S 17/46 |

* cited by examiner

*Primary Examiner* — Tony O Davis
(74) *Attorney, Agent, or Firm* — Artegis Law Group, LLP

(57) ABSTRACT

One embodiment of the present disclosure sets forth a near-eye display system. The near-eye display system comprises a structured light generator including a plurality of reflective surfaces and configured to project a structured light pattern into an eye region of the near-eye display device, the structured light pattern generated based on a diffraction grating created by displacing at least a subset of the plurality of reflective surfaces. The near-eye display system further comprises an image capture device configured to capture one or more images of the structured light pattern incident on an eye proximate to the eye region and a depth mapping controller configured to generate a depth map of the eye based on the captured one or more images.

25 Claims, 10 Drawing Sheets

INTERFEROMETRIC STRUCTURED LIGHT DEPTH SENSING FOR EYE TRACKING

CROSS REFERENCE TO RELATED APPLICATION

This application claims priority benefit of the U.S. Provisional Patent Application titled, "Interferometric Structured Light Depth Sensing for Eye Tracking," filed on Dec. 13, 2017 and having Ser. No. 62/598,393. The subject matter of this related application is hereby incorporated herein by reference.

BACKGROUND

Technical Field

Embodiments of the disclosure relate generally to virtual or augmented reality systems and, more specifically, to interferometric structured light depth sensing for eye tracking.

Description of the Related Art

Providing virtual reality (VR) or augmented reality (AR) content through a near eye display (NED) often relies on tracking the eyes of a wearer of the NED. In particular, media content presented by the NED may be based on eye tracking information (e.g., orientation of the user's eye). For example, the resolution of the media content may be adjusted based on the eye tracking information. In addition, eye tracking information may be used to adjust a focus of content presented by the NED.

Techniques for eye tracking pose two primary drawbacks. First, the form factor and power requirements of typical eye tracking systems often make such systems unsuitable for integration into wearable devices. Second, approaches for eye tracking rely on utilizing generic models of an eye. Accordingly, eye tracking systems may perform poorly for users with eyes that vary from the generic models.

Accordingly, techniques for more effective eye tracking would be useful.

SUMMARY

One embodiment of the present disclosure sets forth a near-eye display system. The near-eye display system comprises a structured light generator including a plurality of reflective surfaces and configured to project a structured light pattern into an eye region of the near-eye display device, the structured light pattern generated based on a diffraction grating created by displacing at least a subset of the plurality of reflective surfaces. The near-eye display system further comprises an image capture device configured to capture one or more images of the structured light pattern incident on an eye proximate to the eye region and a depth mapping controller configured to generate a depth map of the eye based on the captured one or more images.

Another embodiment of the present disclosure sets forth a structured light generator. The structured light generator comprises a plurality of reflective surfaces configured to displace in at least one direction. The structured light generator further comprises an illumination source configured to emit an optical beam incident on the plurality of reflective surfaces. The optical beam incident on the plurality of reflective surfaces is diffracted to generate a structured light pattern, and one or more images of the structured light pattern projected onto an object are captured to generate a depth map of the object.

Another embodiment of the present disclosure sets forth a method comprising driving a plurality of reflective surfaces with a driving voltage to create a diffraction grating, emitting light onto the driven plurality of reflective surfaces to generate a structured light pattern corresponding to the diffraction grating, projecting the structured light pattern onto an object, capturing one or more images of the structured light pattern projected onto the object, and generating a depth map of the object based on the one or more images.

Advantageously, the structured light generator is light weight, has a small form factor, and has a low energy requirement. Accordingly, the structured light generator may be easily integrated into a near-eye display device. In addition, an eye tracking system integrating the structured light generator enables high granularity imaging of a user's eye. Accordingly, the depths of one or more features of a user's eye, such as a pupil, sclera, and iris may be determined and used to generate a user-specific model of an eye. By implementing the user-specific model, the eye tracking operations may be performed with a high reliability factor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skill in the art that the present disclosure may be practiced without one or more of these specific details.

System Overview

Figure 1:
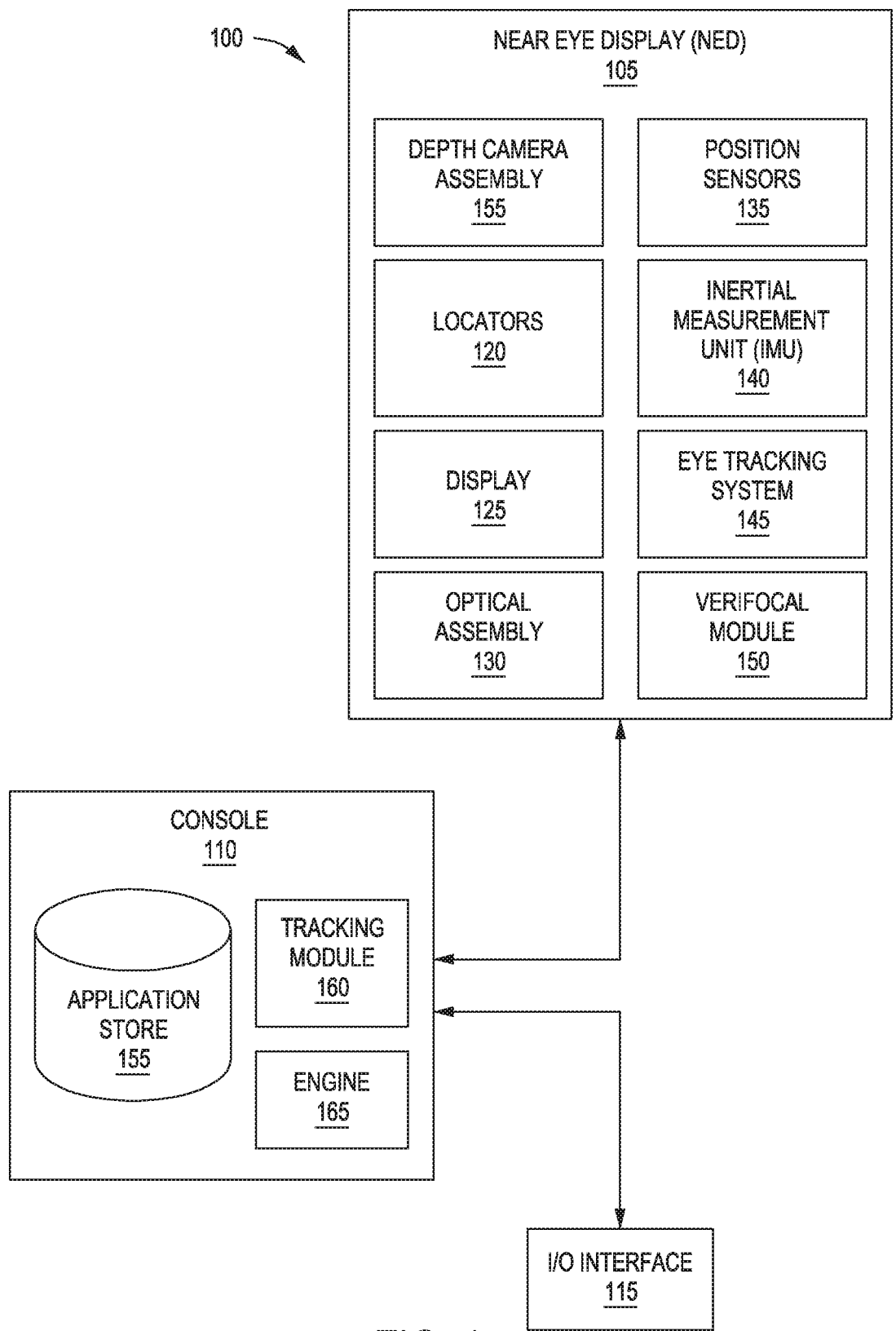
FIG. 1 is a block diagram of an embodiment of a near eye display (NED) system in which a console operates, according to one or more aspects of the present disclosure.

FIG. 1 is a block diagram of an embodiment of a near eye display (NED) system 100 in which a console 110 operates. The NED system 100 may operate in a virtual reality (VR) system environment, an augmented reality (AR) system environment, a mixed reality (MR) system environment, or some combination thereof. The NED system 100 shown in FIG. 1 comprises a NED 105 and an input/output (I/O) interface 115 that is coupled to the console 110.

While FIG. 1 shows an example NED system 100 including one NED 105 and one I/O interface 115, in other embodiments any number of these components may be included in the NED system 100. For example, there may be multiple NEDs 105 that each has an associated I/O interface 115, where each NED 105 and I/O interface 115 communicates with the console 110. In alternative configurations, different and/or additional components may be included in the NED system 100. Additionally, various components included within the NED 105, the console 110, and the I/O interface 115 may be distributed in a different manner than is described in conjunction with FIG. 1-9 in some embodiments. For example, some or all of the functionality of the console 110 may be provided by the NED 105 and vice versa.

The NED 105 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 105 may also present audio content to a user. The NED 105 and/or the console 110 may transmit the audio content to an external device via the I/O interface 115. The external device may include various forms of speaker systems and/or headphones. In various embodiments, the audio content is synchronized with visual content being displayed by the NED 105.

The NED 105 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 1, the NED 105 may include a depth camera assembly (DCA) 155, one or more locators 120, a display 125, an optical assembly 130, one or more position sensors 135, an inertial measurement unit (IMU) 140, an eye tracking system 145, and a varifocal module 150. In some embodiments, the display 125 and the optical assembly 130 can be integrated together into a projection assembly. Various embodiments of the NED 105 may have additional, fewer, or different components than those listed above. Additionally, the functionality of each component may be partially or completely encompassed by the functionality of one or more other components in various embodiments.

The DCA 155 captures sensor data describing depth information of an area surrounding the NED 105. The sensor data may be generated by one or a combination of depth imaging techniques, such as triangulation, structured light imaging, time-of-flight imaging, laser scan, and so forth. The DCA 155 can compute various depth properties of the area surrounding the NED 105 using the sensor data. Additionally or alternatively, the DCA 155 may transmit the sensor data to the console 110 for processing.

The DCA 155 includes an illumination source, an imaging device, and a controller. The illumination source emits light onto an area surrounding the NED 105. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 105, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 120 are objects located in specific positions on the NED 105 relative to one another and relative to a specific reference point on the NED 105. A locator 120 may be a light emitting diode (LED), a corner cube reflector, a reflective marker, a type of light source that contrasts with an environment in which the NED 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof.

In some embodiments, the locators 120 are located beneath an outer surface of the NED 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the NED 105 are opaque in the visible band of wavelengths of light. Thus, the locators 120 may emit light in the IR band under an outer surface that is transparent in the IR band but opaque in the visible band.

The display 125 displays two-dimensional or three-dimensional images to the user in accordance with pixel data received from the console 110 and/or one or more other sources. In various embodiments, the display 125 comprises a single display or multiple displays (e.g., separate displays for each eye of a user). In some embodiments, the display 125 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 125 and used separately, in parallel, and/or in combination.

The optical assembly 130 magnifies image light received from the display 125, corrects optical errors associated with the image light, and presents the corrected image light to a user of the NED 105. The optical assembly 130 includes a plurality of optical elements. For example, one or more of the following optical elements may be included in the optical assembly 130: an aperture, a Fresnel lens, a convex lens, a concave lens, a filter, a reflecting surface, or any other suitable optical element that deflects, reflects, refracts, and/or in some way alters image light. Moreover, the optical assembly 130 may include combinations of different optical elements. In some embodiments, one or more of the optical elements in the optical assembly 130 may have one or more coatings, such as partially reflective or antireflective coatings.

In some embodiments, the optical assembly 130 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 125 is pre-distorted, and the optical assembly 130 corrects the distortion as image light from the display 125 passes through various optical elements of the optical assembly 130. In some embodiments, optical elements of the optical assembly 130 are integrated into the display 125 as a projection assembly that includes at least one waveguide coupled with one or more optical elements.

The IMU 140 is an electronic device that generates data indicating a position of the NED 105 based on measurement signals received from one or more of the position sensors 135 and from depth information received from the DCA 155. In some embodiments of the NED 105, the IMU 140 may be a dedicated hardware component. In other embodiments, the IMU 140 may be a software component implemented in one or more processors.

In operation, a position sensor 135 generates one or more measurement signals in response to a motion of the NED 105. Examples of position sensors 135 include: one or more accelerometers, one or more gyroscopes, one or more magnetometers, one or more altimeters, one or more inclinometers, and/or various types of sensors for motion detection, drift detection, and/or error detection. The position sensors 135 may be located external to the IMU 140, internal to the IMU 140, or some combination thereof.

Based on the one or more measurement signals from one or more position sensors 135, the IMU 140 generates data indicating an estimated current position of the NED 105 relative to an initial position of the NED 105. For example, the position sensors 135 include multiple accelerometers to measure translational motion (forward/back, up/down, left/right) and multiple gyroscopes to measure rotational motion (e.g., pitch, yaw, and roll). In some embodiments, the IMU 140 rapidly samples the measurement signals and calculates the estimated current position of the NED 105 from the sampled data. For example, the IMU 140 integrates the measurement signals received from the accelerometers over time to estimate a velocity vector and integrates the velocity vector over time to determine an estimated current position of a reference point on the NED 105. Alternatively, the IMU 140 provides the sampled measurement signals to the console 110, which analyzes the sample data to determine one or more measurement errors. The console 110 may further transmit one or more of control signals and/or measurement errors to the IMU 140 to configure the IMU 140 to correct and/or reduce one or more measurement errors (e.g., drift errors). The reference point is a point that may be used to describe the position of the NED 105. The reference point may generally be defined as a point in space or a position related to a position and/or orientation of the NED 105.

In various embodiments, the IMU 140 receives one or more parameters from the console 110. The one or more parameters are used to maintain tracking of the NED 105. Based on a received parameter, the IMU 140 may adjust one or more IMU parameters (e.g., a sample rate). In some embodiments, certain parameters cause the IMU 140 to update an initial position of the reference point so that it corresponds to a next position of the reference point. Updating the initial position of the reference point as the next calibrated position of the reference point helps reduce drift errors in detecting a current position estimate of the IMU 140.

In some embodiments, the eye tracking system 145 is integrated into the NED 105. The eye-tracking system 145 may comprise one or more illumination sources and an imaging device (camera). In operation, the eye tracking system 145 generates and analyzes tracking data related to a user's eyes as the user wears the NED 105. The eye tracking system 145 may further generate eye tracking information that may comprise information about a position of the user's eye, i.e., information about an angle of an eye-gaze.

In various embodiments, the eye tracking system 145 estimates the angular orientation of the user's eye. The orientation of the eye corresponds to the direction of the user's gaze within the NED 105. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and ±4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 145 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 105 on a user's head. The eye tracking system 145 may also detect the torsion of the eye, i.e., rotation of the eye about the pupillary axis. The eye tracking system 145 may use the detected torsion of the eye to estimate the orientation of the foveal axis from the pupillary axis. The eye tracking system 145 may also track a change in the shape of the eye, which may be approximated as a skew or scaling linear transform or a twisting distortion (e.g., due to torsional deformation). The eye tracking system 145 may estimate the foveal axis based on some combination of the angular orientation of the pupillary axis, the translation of the eye, the torsion of the eye, and the current shape of the eye.

In one embodiment, the eye tracking system 145 includes at least one emitter which projects a structured light pattern on all or a portion of the eye. The eye tracking system 145 also includes at least one camera which captures images of the light pattern projected onto the eye. By evaluating the images of the illumination pattern projected on the surface of the eye, the eye tracking system 145 generates a depth map of the eye. The eye tracking unit 145 can estimate the pupillary axis, the translation of the eye, the torsion of the eye, and the current shape of the eye based on the generated depth map.

As the orientation may be determined for both eyes of the user, the eye tracking system 145 is able to determine where the user is looking. The NED 105 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and though the point halfway between the pupils of the user's eyes.

In some embodiments, the varifocal module 150 is integrated into the NED 105. The varifocal module 150 may be communicatively coupled to the eye tracking system 145 in order to enable the varifocal module 150 to receive eye tracking information from the eye tracking system 145. The varifocal module 150 may further modify the focus of image light emitted from the display 125 based on the eye tracking information received from the eye tracking system 145. Accordingly, the varifocal module 150 can reduce vergence-accommodation conflict that may be produced as the user's eyes resolve the image light. In various embodiments, the varifocal module 150 can be interfaced (e.g., either mechanically or electrically) with at least one optical element of the optical assembly 130.

In operation, the varifocal module 150 may adjust the position and/or orientation of one or more optical elements in the optical assembly 130 in order to adjust the focus of image light propagating through the optical assembly 130. In various embodiments, the varifocal module 150 may use eye tracking information obtained from the eye tracking system 145 to determine how to adjust one or more optical elements in the optical assembly 130. In some embodiments, the varifocal module 150 may perform foveated rendering of the image light based on the eye tracking information obtained from the eye tracking system 145 in order to adjust the resolution of the image light emitted by the display 125. In this case, the varifocal module 150 configures the display 125 to display a high pixel density in a foveal region of the user's eye-gaze and a low pixel density in other regions of the user's eye-gaze.

The I/O interface 115 facilitates the transfer of action requests from a user to the console 110. In addition, the I/O interface 115 facilitates the transfer of device feedback from the console 110 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 115 may include one or more input devices. Example input devices include: a keyboard, a mouse, a game controller, a joystick, and/or any other suitable device for receiving action requests and communicating the action requests to the console 110. In some embodiments, the I/O interface 115 includes an IMU 140 that captures calibration data indicating an estimated current position of the I/O interface 115 relative to an initial position of the I/O interface 115.

In operation, the I/O interface 115 receives action requests from the user and transmits those action requests to the console 110. Responsive to receiving the action request, the console 110 performs a corresponding action. For example, responsive to receiving an action request, console 110 may configure I/O interface 115 to emit haptic feedback onto an arm of the user. For example, console 115 may configure I/O interface 115 to deliver haptic feedback to a user when an action request is received. Additionally or alternatively, the console 110 may configure the I/O interface 115 to generate haptic feedback when the console 110 performs an action, responsive to receiving an action request.

The console 110 provides content to the NED 105 for processing in accordance with information received from one or more of: the DCA 155, the eye tracking system 145, one or more other components of the NED 105, and the I/O interface 115. In the embodiment shown in FIG. 1, the console 110 includes an application store 155, a tracking module 160, and an engine 165. In some embodiments, the console 110 may have additional, fewer, or different modules and/or components than those described in conjunction with FIG. 1. Similarly, the functions further described below may be distributed among components of the console 110 in a different manner than described in conjunction with FIG. 1.

The application store 155 stores one or more applications for execution by the console 110. An application is a group of instructions that, when executed by a processor, performs a particular set of functions, such as generating content for presentation to the user. For example, an application may generate content in response to receiving inputs from a user (e.g., via movement of the NED 105 as the user moves his/her head, via the I/O interface 115, etc.). Examples of applications include: gaming applications, conferencing applications, video playback applications, or other suitable applications.

The tracking module 160 calibrates the NED system 100 using one or more calibration parameters. The tracking module 160 may further adjust one or more calibration parameters to reduce error in determining a position and/or orientation of the NED 105 or the I/O interface 115. For example, the tracking module 160 may transmit a calibration parameter to the DCA 155 in order to adjust the focus of the DCA 155. Accordingly, the DCA 155 may more accurately determine positions of structured light reflecting off of objects in the environment. The tracking module 160 may also analyze sensor data generated by the IMU 140 in determining various calibration parameters to modify. Further, in some embodiments, if the NED 105 loses tracking of the user's eye, then the tracking module 160 may re-calibrate some or all of the components in the NED system 100.

The tracking module 160 tracks the movements of the NED 105 and/or of the I/O interface 115 using information from the DCA 155, the one or more position sensors 135, the IMU 140 or some combination thereof. For example, the tracking module 160 may determine a reference position of the NED 105 from a mapping of an area local to the NED 105. The tracking module 160 may generate this mapping based on information received from the NED 105 itself. The tracking module 160 may also utilize sensor data from the IMU 140 and/or depth data from the DCA 155 to determine references positions for the NED 105 and/or I/O interface 115. In various embodiments, the tracking module 160 generates an estimation and/or prediction for a subsequent position of the NED 105 and/or the I/O interface 115. The tracking module 160 may transmit the predicted subsequent position to the engine 165.

The engine 165 generates a three-dimensional mapping of the area surrounding the NED 105 (i.e., the "local area") and/or the eye of a user wearing the NED 105 based on information received from the NED 105. In some embodiments, the engine 165 determines depth information for the three-dimensional mapping of the local area or the eye based on depth data received from the NED 105. In various embodiments, the engine 165 uses depth data received from the NED 105 to update a model of the local area and/or the eye and to generate and/or modify media content based in part on the updated model(s).

The engine 165 also executes applications within the NED system 100 and receives position information, acceleration information, velocity information, predicted future positions, or some combination thereof, of the NED 105 from the tracking module 160. Based on the received information, the engine 165 determines various forms of media content to transmit to the NED 105 for presentation to the user. For example, if the received information indicates that the user has looked to the left, the engine 165 generates media content for the NED 105 that mirrors the user's movement in a virtual environment or in an environment augmenting the local area with additional media content. Accordingly, the engine 165 may generate and/or modify media content (e.g., visual and/or audio content) for presentation to the user. The engine 165 may further transmit the media content to the NED 105. Additionally, in response to receiving an action request from the I/O interface 115, the engine 165 may perform an action within an application executing on the console 110. The engine 105 may further provide feedback when the action is performed. For example, the engine 165 may configure the NED 105 to generate visual and/or audio feedback and/or the I/O interface 115 to generate haptic feedback to the user.

In some embodiments, based on the eye tracking information (e.g., orientation of the user's eye) received from the eye tracking system 145, the engine 165 determines a resolution of the media content provided to the NED 105 for presentation to the user on the display 125. The engine 165 may adjust a resolution of the visual content provided to the NED 105 by configuring the display 125 to perform foveated rendering of the visual content, based at least in part on a direction of the user's gaze received from the eye tracking system 145. The engine 165 provides the content to the NED 105 having a high resolution on the display 125 in a foveal region of the user's gaze and a low resolution in other regions, thereby reducing the power consumption of the NED 105. In addition, using foveated rendering reduces a number of computing cycles used in rendering visual content without compromising the quality of the user's visual experience. In some embodiments, the engine 165 can further use the eye tracking information to adjust a focus of the image light emitted from the display 125 in order to reduce vergence-accommodation conflicts.

Figure 2:
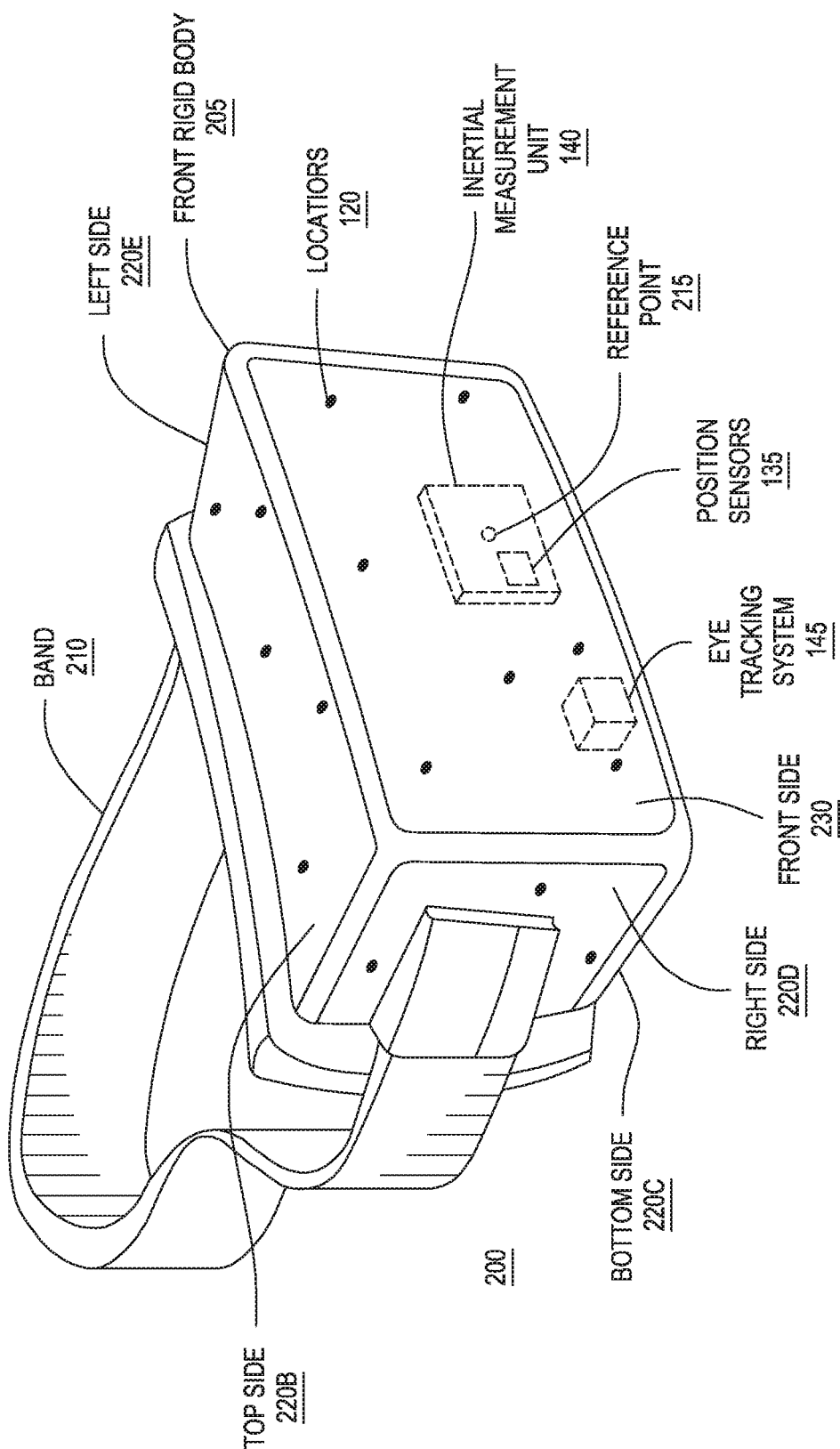
FIG. 2 is a diagram of an NED, in accordance with an embodiment.

FIG. 2 is a diagram of an NED 200, in accordance with an embodiment. The NED 200 is an embodiment of the NED 105 and includes a front rigid body 205 and a band 210. The front rigid body 205 includes an electronic display element of the electronic display 125 (not shown in FIG. 2), the optics assembly 130 (not shown in FIG. 2), the IMU 140, the one or more position sensors 135, the eye tracking system 145, and the locators 120. In the embodiment shown by FIG. 2, the position sensors 135 are located within the IMU 140, and neither the IMU 140 nor the position sensors 135 are visible to the user.

The locators 120 are located in fixed positions on the front rigid body 205 relative to one another and relative to a reference point 215. In the example of FIG. 2, the reference point 215 is located at the center of the IMU 140. Each of the locators 120 emit light that is detectable by the imaging device in the DCA 155. The locators 120, or portions of the locators 120, are located on a front side 220A, a top side 220B, a bottom side 220C, a right side 220D, and a left side 220E of the front rigid body 205 in the example of FIG. 2.

The NED 200 includes the eye tracking system 145. As discussed above, the eye tracking system 145 may include a structured light generator that projects an interferometric structured light pattern onto the user's eye and a camera to detect the illuminated portion of the eye. The emitter and the camera may be located off the axis of the user's gaze. In FIG. 2, the eye tracking system 145 is located below the axis of the user's gaze, although the eye tracking system 145 can alternately be placed elsewhere. Also, in some embodiments, there is at least one eye tracking unit for the left eye of the user and at least one tracking unit for the right eye of the user.

Figure 3:
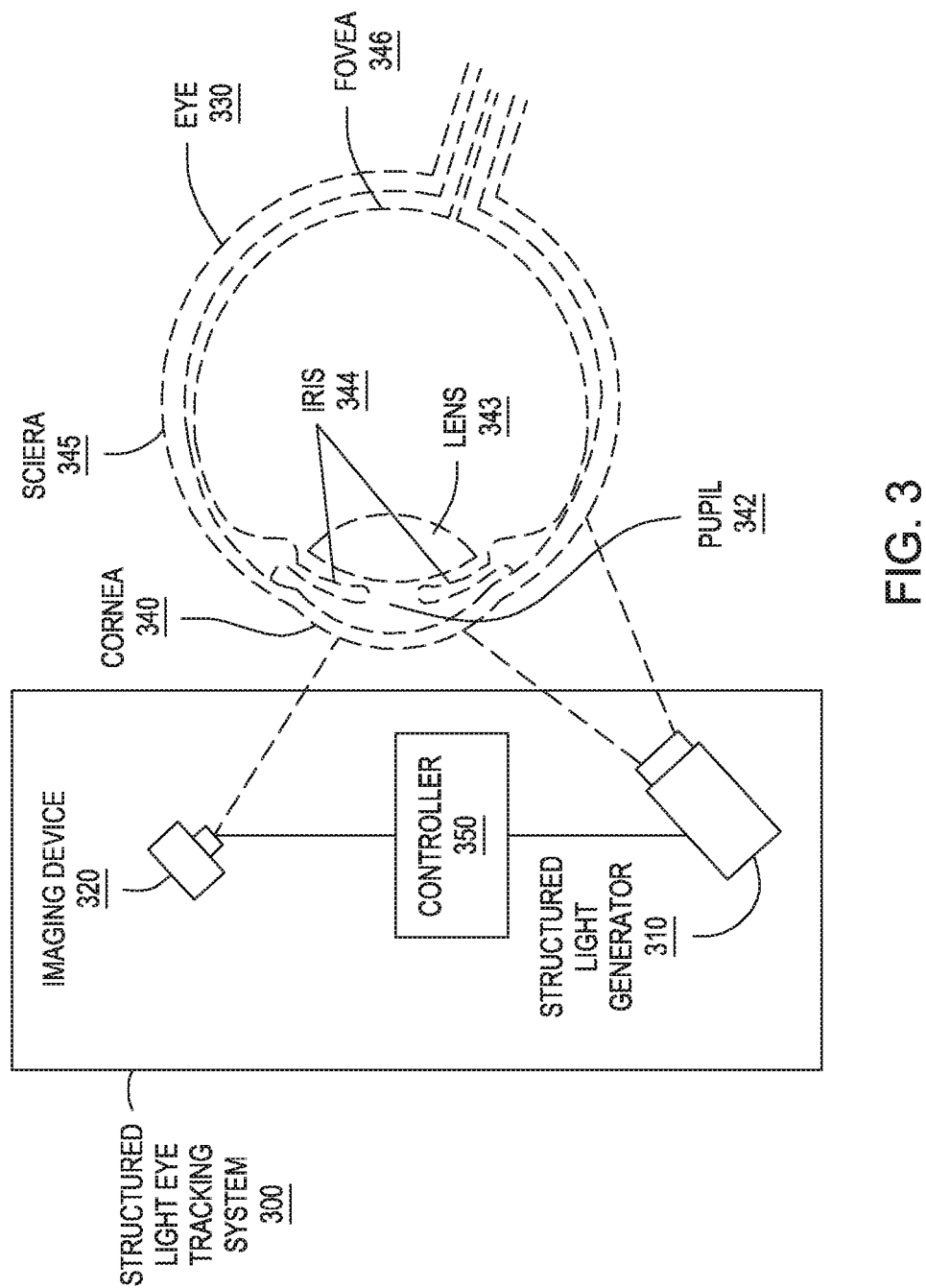
FIG. 3 illustrates a structured light eye tracking system, in accordance with an embodiment.

FIG. 3 illustrates a structured light eye tracking system 300, in accordance with an embodiment. FIG. 3 also illustrates a cross-section of the eye 330. In some embodiments, the structured light eye tracking system 300 is a component of the eye tracking system 145 of an NED (e.g., NED 105 or NED 200). In alternate embodiments, the structured light eye tracking system 300 is part of an AR NED, a VR/AR system that is not a NED, or some other system which employs eye tracking. The structured light eye tracking system 300 includes an interferometric structured light generator 310, an imaging device 320, and a depth map controller 350 (also referred to as "controller 350"). FIG. 3 illustrates a single structured light generator 310 and a single imaging device 320. However, in alternate embodiments, multiple structured light emitters or multiple imaging devices may be employed for a single eye. Similarly, for each of the user's eyes, a corresponding structured light emitter 310 and imaging device 320 may be employed.

The eye 330 illustrated in FIG. 3 includes a cornea 340, a pupil 342, a lens 343, an iris 344, a sclera 345, and a fovea 346. The sclera 345 is the relatively opaque (usually visibly white) outer portion of the eye 330, which is often referred to as the "white of the eye." The cornea 340 is the curved surface covering the iris and the pupil of the eye. The cornea 340 is essentially transparent in the visible band (380 nm to 750 nm) of the electromagnetic spectrum, and the near-infrared region (up to approximately 1,400 nanometers). The lens 343 is a transparent structure that serves to focus light at the retina (the back of the eye 330). The iris 344 is a thin, colored, circular diaphragm concentric with the pupil 342. The iris 344 is the colored portion of the eye which contracts to alter the size of the pupil 342, a circular hole through which light enters the eye 330. The fovea 346 is an indent on the retina. The fovea 346 corresponds to the area of highest visual acuity.

The structured light generator 310 emits structured light patterns (also referred to herein as "interferometric light patterns") onto an eye region of the NED where the eye 330 is located when the NED is worn by a user. In the context of a single eye of a user, the interferometric light pattern is incident upon the surface of at least a portion of the eye 330. In some embodiments, the portion of the eye includes the iris 344, the sclera 345, the cornea 340, or any combination thereof. In some embodiments, multiple structured light emitters project interferometric light patterns onto a single eye 330. In some embodiments, a first structured light generator projects a first interferometric light pattern onto one of the user's eyes and a second structured light generator projects a second interferometric light pattern onto the other eye. The structured light generator 310 is described in greater detail below in conjunction with FIG. 4.

The imaging device 320 detects the light pattern projected on the portion of the eye 330 illuminated by light emitted by the structured light generator 310. The imaging device 320 detects the distorted illumination pattern and converts the captured light into a digital image. The imaging device 320 may capture images at a first frequency during normal operating conditions, but certain conditions may trigger the imaging device 320 to capture images at a higher frequency. In one embodiment, the light pattern projected on the portion of the eye 330 is a moving fringe pattern. The rate at which the moving fringe pattern is projected is controlled (for example, using a laser strobing technique) such that the fringe pattern appears stationary to the imaging device 320. The controller 350 analyzes the images to calculate depths relative to the NED 200 of various features of and points on the eye, as further described below in conjunction with FIGS. 4-9.

In various embodiments, the imaging device 320 captures and records particular ranges of wavelengths of light (i.e., "bands" of light). Example wavelength bands of light captured by the imaging device 320 include: a visible band (~380 nanometers (nm) to 750 nm), an infrared (IR) band (~750 nm to 2,200 nm), an ultraviolet band (100 nm to 380 nm), another portion of the electromagnetic spectrum, or some combination thereof. For example, in some embodiments, the imaging device 320 captures images including light in the visible band and/or in the infrared band.

In one embodiment, the imaging device 320 may be an infrared camera (i.e., a camera designed to capture images in the infrared frequency). The camera may be a near-infrared camera with digital image sensors sensitive to the bandwidth of light emitted by the structured light generator 310. The imaging device 320 includes a multi-tap, CCD or CMOS digital image sensor and an optical element. The optical element may be one or more lenses, a high-pass, low-pass, or band-pass filter, a polarizer, an aperture stop, a diaphragm, some other optical element suitable for processing IR light, or some combination thereof. The optical element outputs light that is captured and converted into a digital signal by the CCD or CMOS digital sensor.

Generating an Eye Depth Map Using
Interferometric Light Patterns

As discussed above, in some embodiments, the structured light eye tracking system 300 implements structured light imaging techniques to generate depth information. In particular, the structured light generator 310 is configured to emit a series of interferometric light patterns into an eye region of the NED 200. Each interferometric light pattern may be phase shifted from a previous illumination pattern by a given amount. The imaging device 320 includes one or more sensors comprising multiple pixels that may capture a phase shift in the interferometric light patterns. For example, the imaging device 320 may capture multiple images of a periodic interferometric light pattern and may further detect phase shifts in the periodic interferometric light pattern. In some embodiments, the controller 350 may analyze the images captured by the imaging device 320 to detect the phase shifts by determining relative intensities of the periodic interferometric light pattern across the multiple captured images. As is well-known in the art, there is a functional correspondence between the detected phase shifts and a depth of an object on which the light is projected. In various embodiments, the structured light eye tracking system 300 analyzes the detected phase shifts to determine the depth of various features and portions of the eye 330.

Figure 4A:
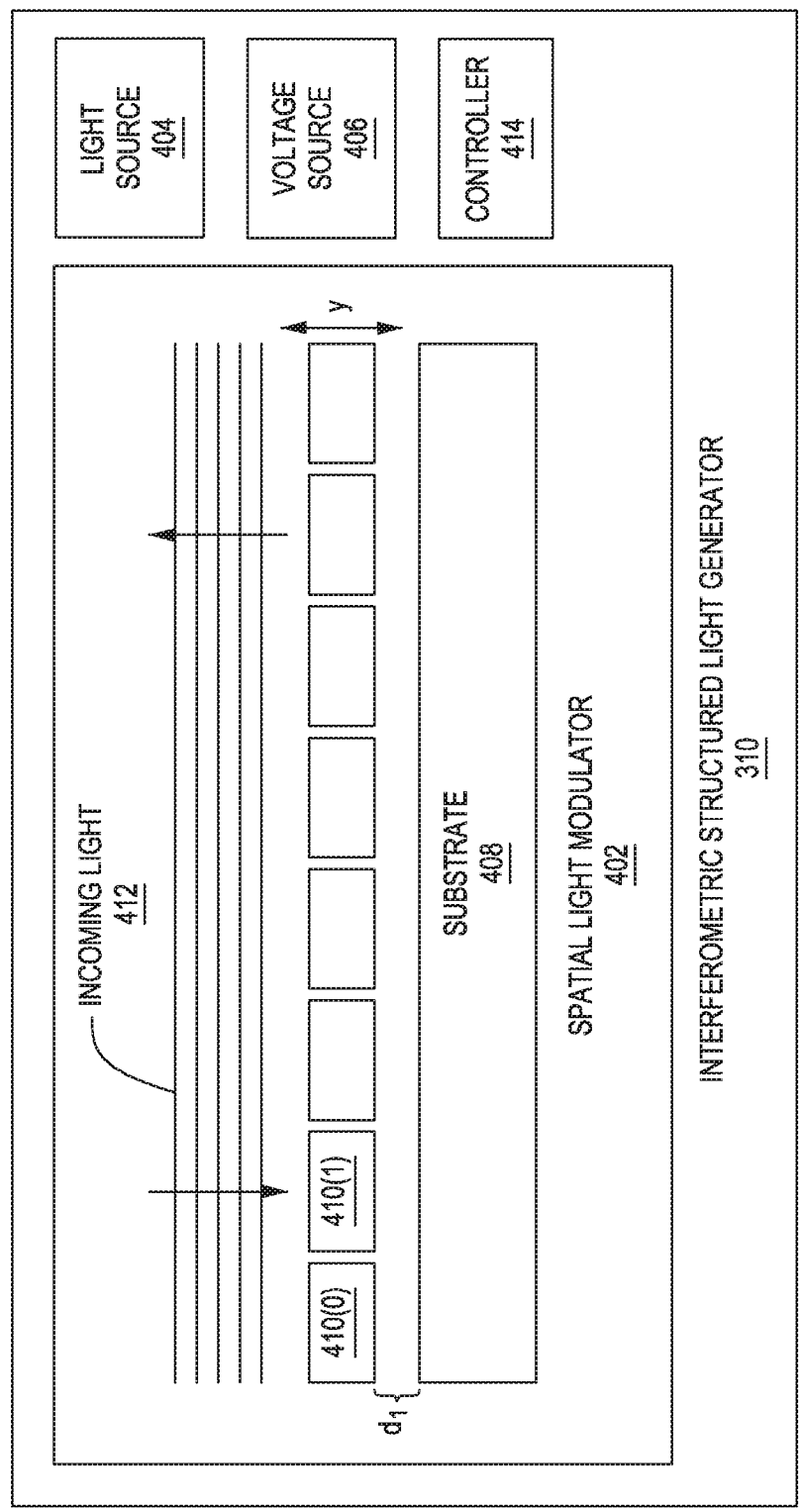
FIGS. 4A and 4B illustrate a structured light generator included in the structured light eye tracking system, in accordance with various embodiments.
Figure 4B:
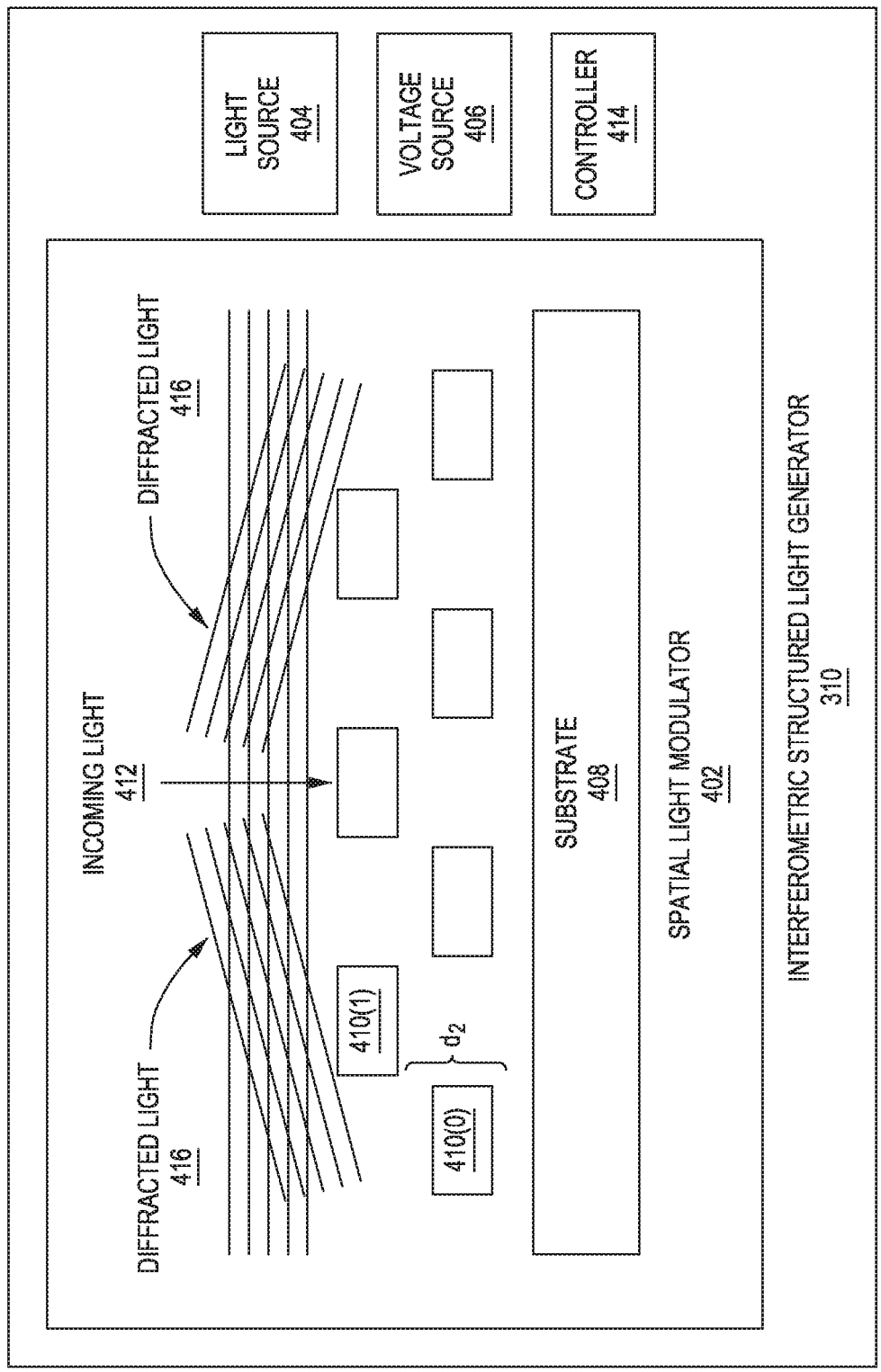

FIGS. 4A and 4B illustrate a structured light generator 310 included in the structured light eye tracking system 300, in accordance with various embodiments. As discussed above, the structured light generator 310 emits an interferometric light pattern onto an eye region of the NED. The eye region corresponds to an area where the eye 330 is located when the NED is worn by a user. In order to generate the interferometric light pattern, the structured light generator 310 includes a spatial light modulator 402, a light source 404, a voltage source 406, and a controller 414.

The spatial light modulator 402 operates as a reflective diffraction grating and reflects incoming light in a highly controlled manner to a target destination, such as the eye region of the NED. In operation, the spatial light modulator 402 is controlled by the controller 414 and modulates incoming light generated by the light source 404 with high speed and precision. The modulated light creates continuous intensity patterns of light that can be used for imaging surfaces. In one embodiment, the structured light generator 310 includes two or more spatial light modulators 402 that each operates as a reflective diffraction grating to generate the structured illuminations. Each spatial light modulator 402 includes several reflective ribbons that diffract light incident on the spatial light modulator 402. Further, at a given time, each spatial light modulator 402 may be configured to generate structured illuminations having a different intensity.

The light source 404 includes a plurality of emitters that each emits light having certain characteristics (e.g., wavelength, polarization, coherence, temporal behavior, etc.). The characteristics may be the same or different across the emitters, and the emitters can be operated simultaneously or individually. In one embodiment, the plurality of emitters could be laser diodes (such as edge emitters), inorganic or organic light-emitting diodes (LEDs), a vertical-cavity surface-emitting laser (VCSEL), or some other light source.

The spatial light modulator 402 includes a substrate 408 and a set of grating ribbons 410 (individually referred to as a "grating ribbon 410" and collectively referred to as "grating ribbons 410"). In one embodiment, the substrate 408 is a silicon substrate. The grating ribbons 410 are suspended above the substrate 408, leaving an air gap between the substrate 408 and the grating ribbons 410. In one embodiment, each of the grating ribbons 410 operates as a reflector and reflects incoming light to a target destination. Each grating ribbon is individually movable in the y-direction illustrated in FIG. 4A. In other embodiments, every other grating ribbon or other combinations of the grating ribbons may be individually movable in the y-direction illustrated in FIG. 4A.

In operation, the controller 414 controls the voltage supplied to the spatial light modulator 402 such that the spatial light modulator 402 operates in one of two states: unaddressed (also referred to as the "off state") and addressed (also referred to as the "on state"). In the unaddressed state, the voltage source 406 does not supply any voltage to the spatial light modulator 402. Thus, the grating ribbons 410 all have the same position and orientation and reflect any light, such as light emitted by the light source 404, that is incident on the grating ribbons 410. FIG. 4A illustrates the spatial light modulator 402 in the unaddressed state according to one embodiment. As shown, each of the grating ribbons 410 is the same distance $d_1$ from the substrate 408. In the unaddressed state, incoming light 412 is largely reflected off of the grating ribbons 410 with little to no diffraction of the incoming light 412.

In the addressed state, the controller 414 selectively supplies a voltage via the voltage source 406 to the spatial light modulator 402. The supplied voltage induces a voltage potential between the grating ribbons 410 and the substrate 408. The voltage potential causes one or more of the grating ribbons 410 to change a respective position and/or orientation. The position and/or orientation of the grating ribbons 410 produces a phase and/or amplitude modulations in the light emitted by the light source 404 and reflected off the grating ribbons 410. These modulations are highly precise and fast, producing high accuracy interferometric light patterns for imaging.

In one embodiment, in the addressed state, the controller 414 supplies voltage to the spatial light modulator 402 to modify the positions of the grating ribbons 410 in an alternating pattern, forming a square diffraction grating. FIG. 4B illustrates the spatial light modulator 402 in the addressed state where the grating ribbons 410 form a square diffraction grating. The depth of the grating is defined by $d_2$, which can be controlled by changing the driving voltage supplied to the spatial light modulator 402. As shown, incoming light 412 that is incident on the square diffraction grating is reflected at angles forming diffracted light 416. The diffracted light 416 produces an interferometric light pattern at the target destination.

In various embodiments, the position and/or orientation of each grating ribbon 410 is electronically controlled to produce a given amplitude and/or phase modulated signal to the target destination. In particular, the grating ribbons 410 may be controlled to replicate the effects of a diffraction grating. For example, the spatial light modulator 402 may operate as a reflective diffraction grating. Accordingly, the position and/or orientations of the grating ribbons 410 may be modified periodically in order to purely reflect light off of the grating ribbons 410 and/or to reflect light at angles that produce interferometric light patterns at the target destination.

In some embodiments, in the "on" state, the grating ribbons 410 may be controlled as two or more sets of grating ribbons 410. The position and orientation of each set of grating ribbons 410 may be alternatively modified between a first position and/or orientation and a second position and/or orientation. Accordingly, the spatial light modulator 402 may produce a time-varying light pattern at the target destination. The switching speed of the grating ribbons 410 between the first position and the second position may be up to 20 nanoseconds per cycle. Additionally or alternatively, the set of grating ribbons 410 may be switched at two or more frequencies. Accordingly, multiple interferometric light patterns may be produced at a target destination. For example, the spatial light modulator 402 may produce a spatially varying amplitude and/or phase modulated light pattern that increases and/or decreases in frequency. Accordingly, both the spatially frequency and phase shift of light may be controlled by modulating the position and/or orientation of the grating ribbons 410.

In one embodiment, the spatial light modulator 402 is a microelectromechanical systems (MEMS) device. The MEMS device may be fabricated using either standard CMOS processing techniques or more customized MEMS fabrications techniques. Utilizing CMOS processing provides a standardized process for generating the spatial light modulator 402. In particular, the CMOS processing includes defining active areas, etching and fillings tranches, implanting well regions, depositing and patterning a polysilicon layer, implanting source and drain regions and substrate contacts, creating contact and via windows, and depositing and patterning a metal layer. In alternative embodiments, utilizing MEMS fabrication techniques may enable the spatial light modulator 402 to be fabricated in a wider selection of materials and to generally be more customizable. The spatial light modulator 402 may be fabricated in a variety of form factors, including square, round, rectangular, and so forth. In addition, the spatial light modulator 402 may be fabricated to include grating ribbons 410 having a particular size, width, spacing, and orientation.

Figure 5:
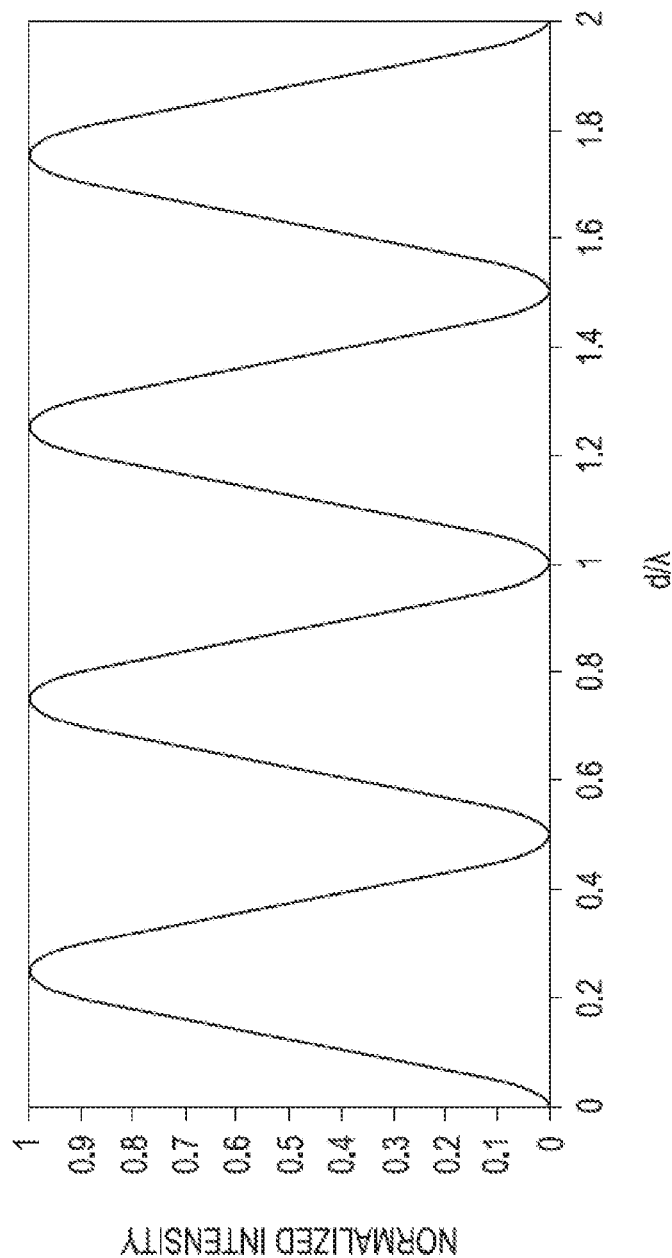
FIG. 5 illustrates a normalized intensity of the first order diffraction of light emitted from the spatial light modulator, in accordance with various embodiments.

FIG. 5 illustrates a normalized intensity of the first order diffraction of light emitted from the spatial light modulator 402, in accordance with various embodiments. The normalized intensity is illustrated as a function of the depth of the diffraction grating formed by the grating ribbons 410 and the wavelength of the of light incident on the grating ribbons 410. In the addressed state, the functional ratio between the grating depth and a wavelength of diffracted light is:

$$I = I_0 \sin\left(\frac{2\pi d}{\lambda}\right)^2 \qquad (1)$$

where $I_0$ is the peak intensity, d is the depth of grating, and $\lambda$ is the wavelength. As seen in FIG. 5 the normalized intensity reaches maximum at $d/\lambda=0.25$.

Figure 6B:
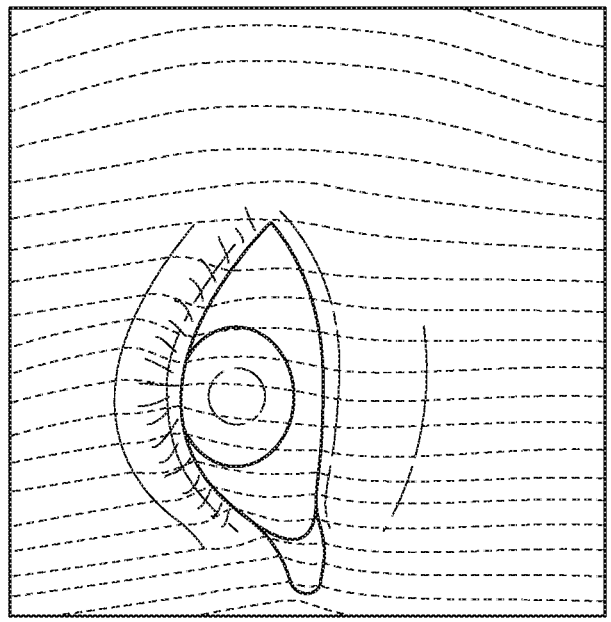
FIGS. 6A and 6B illustrate an interferometric light pattern projected onto the eye by the spatial light modulator, in accordance with various embodiments.
Figure 6A:
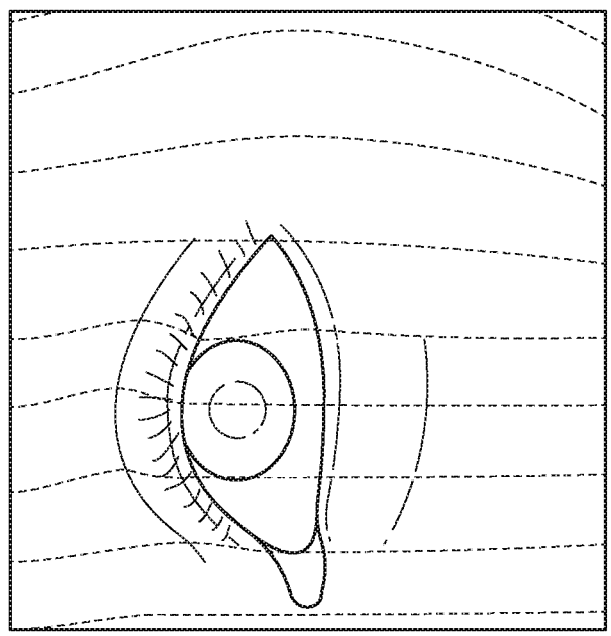

FIGS. 6A and 6B illustrate an interferometric light pattern projected onto the eye 330 by the spatial light modulator 402, in accordance with various embodiments. As shown, the interferometric light pattern projected onto an eye of the user in FIG. 6A is less densely spaced than in FIG. 6B. In particular, the frequency of the interferometric light pattern and the width of the dark (destructive interference) and light (constructive interference) regions of the projected light pattern are controlled by voltage supplied to the spatial light modulator 402. In particular, by increasing or decreasing the separation $d_2$, the structured light eye tracking system 300 may increase or decrease the spatial frequency of the interferometric light pattern. In addition, the fabrication parameters of the structured light eye tracking system 300 affects the characteristics of the interferometric light patterns projected onto the eye. For example, by increasing or decreasing the width and the spatial separation of the grating ribbons 410, various parameters of the projected interferometric light pattern may be adjusted, including, but not limited to, the average frequency of the interferometric light pattern, and/or the width of the dark (destructive interference) and light (constructive interference) regions.

As described above, the structured light eye tracking system 300 may determine a phase shift between the interferometric light pattern outputted by the structured light generator 310 and the light detected by the imaging device 320. The structured light eye tracking system 300 may perform one or more signal processing techniques to detect the phase shift. For example, the structured light eye tracking system 300 may perform a Fourier transformation on the detected light to determine a frequency of oscillation. In some embodiments, the structured light eye tracking system 300 may set the amplitude of the fundamental harmonic to equal an amplitude of background light detected by the imaging device 320. Additionally or alternatively, the structured light eye tracking system 300 may vary amplitudes of one or more higher harmonics to reduce signal noise produced by background light levels at the imaging device 320. Accordingly, the structured light eye tracking system 300 may more easily isolate signals produced at the imaging device 320 by the reflected interferometric light patterns from signal noise produced by background light levels that may be produced by light reflecting off of a user's eyes and/or other background light sources detected by the imaging device 320.

Figure 7:
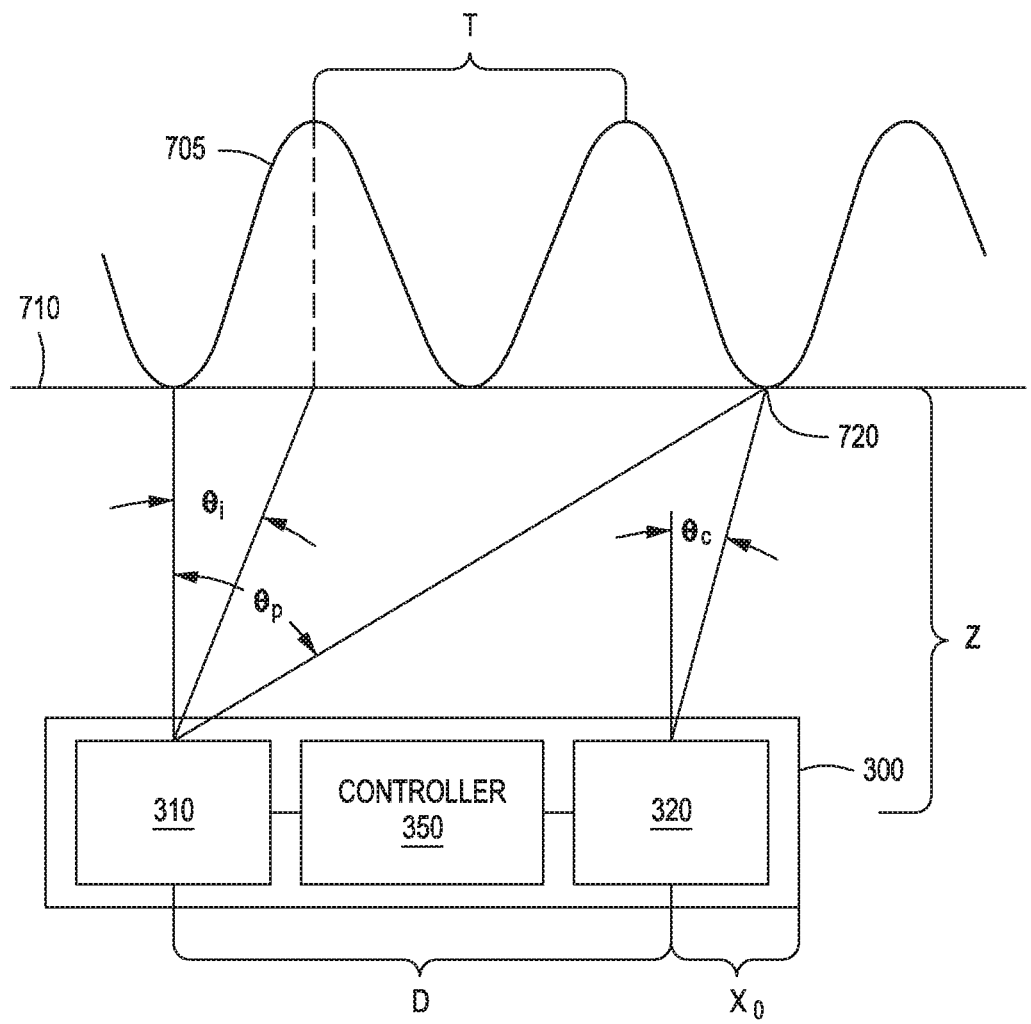
FIG. 7 illustrates an example of light emitted by the spatial light modulator in the structured light generator and captured by the imaging device, in accordance with various embodiments.

FIG. 7 illustrates an example of light emitted by the spatial light modulator 402 in the structured light generator 310 and captured by the imaging device 320, in accordance with various embodiments. The imaging device 320 and the structured light generator 310 are separated by a specific distance D (also referred to as a "baseline"). The distance D between the imaging device 320 and the structured light generator 310 is stored in a storage device coupled to the imaging device 320, coupled to the controller 350, or coupled to the console 110 in various embodiments.

In the illustration of FIG. 7, the structured light generator 310 emits an intensity pattern of light 705 onto an eye region of the NED 104 and within a field of view of the imaging device 320. The intensity pattern of light 705 has a period T known to the controller 350. Additionally, FIG. 7 illustrates an angle $\theta_i$ that is one half of the period T of the intensity pattern of light 705. As the intensity pattern of light 705 scales laterally with the depth from the structured light eye tracking system 300, $\theta_i$ defines a depth independent periodicity of the intensity pattern. Similarly, FIG. 7 illustrates an angle $\theta_c$ between a perpendicular to a plane including the imaging device 320 and a location on the target 710 from which a particular pixel of a sensor included in the imaging device 320 captures intensities of the intensity pattern of light 705 in different images. Hence, $\theta_c$ specifies an angle between a perpendicular to the plane including the imaging device 320 and the location on the target 710 from which the specific pixel captures intensities of the intensity pattern of light 705 emitted by the structured light generator 310.

Each pixel of the sensor of the imaging device 320 provides an intensity of light from the intensity pattern of light 705 captured in multiple images to a controller 350 or to the console 110. The controller 350 determines a phase shift, $\phi$, of the intensity pattern of light 705 captured by each pixel of the sensor. Each image captured by the imaging device 320 is a digital sampling of the intensity pattern of light 705, so the set of images captured by the sensor represent a Fourier transform of the intensity pattern of light 705, and the Fourier components, $a_1$ and $b_1$, of the fundamental harmonic of the intensity pattern 705 are directly related to the phase shift for a pixel of the sensor. For images captured by a pixel of the sensor, the Fourier components $a_1$ and $b_1$ are determined using the following equations:

$$a_1 = \sum_{n=1}^{N} S_n \cos(\theta_n) \Delta\theta \qquad (2)$$

$$b_1 = \sum_{n=1}^{N} S_n \sin(\theta_n) \Delta\theta \qquad (3)$$

In equations (2) and (3) above, $S_n$ denotes an intensity of the pixel of the sensor in a particular image, n, captured by the sensor, and the set of $\theta_n$ represents the phase shifts introduced into the intensity pattern of light 705. For example, if three phase shifts are used, the set of $\theta_n$ includes 0 degrees, 120 degrees, and 240 degrees. As another example, if four phase shifts are used the set of $\theta_n$ includes 0 degrees, 90 degrees, 180 degrees, and 270 degrees. In some embodiments, the set of $\theta_n$ is determined such that 0 degrees and 360 degrees are uniformly sampled by the captured images. Persons skilled in the art will readily recognize that the set of $\theta_n$ may include any values in different implementations.

From the Fourier components $a_1$ and $b_1$ determined as described above, the controller 350 determines the phase shift $\phi$ of the intensity pattern of light 705 captured by a pixel of the sensor as follows:

$$\phi(R) = \tan^{-1}\left(\frac{a_1}{b_1}\right) - \theta_1 \qquad (4)$$

$$R = \sqrt{a_1^2 + b_1^2} \qquad (5)$$

In equations (4) and (5) above, $\phi$ is the phase shift of the first harmonic of the intensity pattern of light 705, R is the magnitude of the first harmonic of the intensity pattern of light 705, and $\theta_1$ is a calibration offset. For each spatial frequency of the intensity pattern of light 705, the controller 350 determines phase shifts using the intensity of the pixel of the sensor in at least three images.

The phase shift of the first harmonic of the intensity pattern 705 determined through equation (4) above is used by a controller 350 coupled to the imaging device 320 and to the structured light generator 310. In various embodiments, the controller 350 is a processor that may be included in the imaging device 320, in the structured light generator 310, or in the console 110 to determine the depth of the location of the target 710 from which the pixel of the sensor captures intensities of the intensity pattern of light 705. The depth may be computed based on the following equation:

$$z = \frac{D}{\frac{\tan(\theta_i)}{\pi}(\phi_{ij} - \phi_{ij,cal}) - \tan(\theta_c)} \qquad (6)$$

In equation (6) above, z is the depth of the location of the target 710 from which the pixel of the sensor captures intensities of the intensity pattern of light 705; D is the distance between the structured light generator 310 and the imaging device 320; $\theta_i$ is one half of the period T of the intensity pattern of light 705; and $\theta_c$ is an angle between a perpendicular to a plane including the imaging device 320 and the location on the target 710 from which a particular pixel located at row i and column j of the sensor included in the imaging device 320 captured intensities of the intensity pattern of light 705. Additionally, $\phi_{ij}$ is the phase shift determined for the pixel at row i and column j of the sensor, determined as described above. Further, $\phi_{ij,cal}$ is a calibration offset for the pixel of the sensor at row i and column j of the sensor.

The controller 350 determines phase shifts for each of at least a set of pixels of the sensor of the imaging device 320, as described above. For each of at least the set of pixels, the controller 350 determines a depth from the controller 350 to a location in the eye region of the NED 105 from which a pixel of the set captured intensities of the intensity pattern of light 705 emitted into the eye region. In some embodiments, each pixel of the sensor of the imaging device 320 captures a depth from the structured light eye tracking system 300 to a location on the eye from which a pixel captured intensities of the intensity pattern of light 705. The controller 350 may generate a depth map identifying depths from the structured light eye tracking system 300 to different locations on the eye from which different pixels captured intensities of the intensity pattern of light 705. For example, the generated depth map identifies depths from the structured light eye tracking system 300 to different locations on the eye based on intensities captured by each pixel of the sensor, with a depth corresponding to a pixel of the sensor that captured intensities used to determine the depth.

Figure 8C:
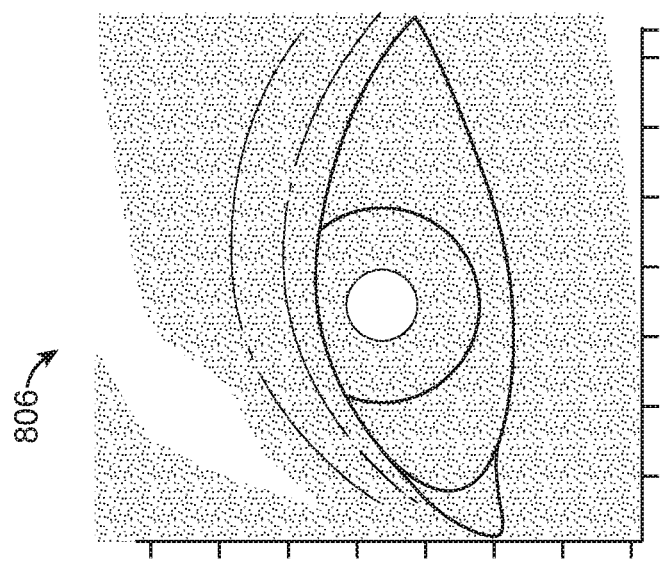
FIGS. 8A-8C illustrate depth maps constructed based on interferometric light patterns detected by the imaging device, in accordance with various embodiments.
Figure 8B:
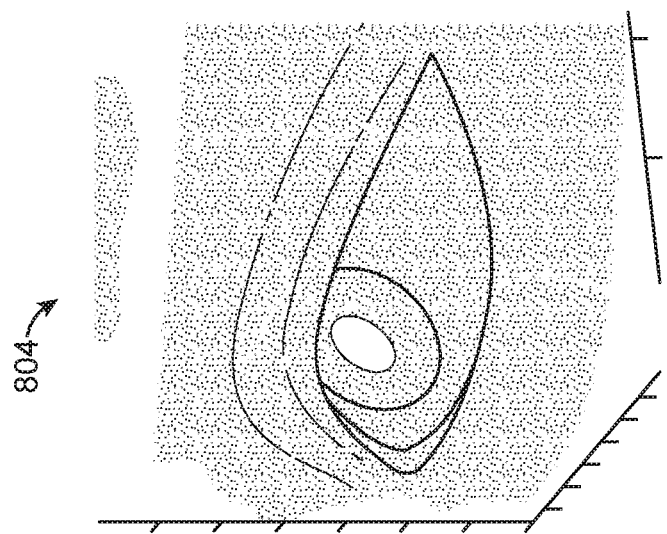
Figure 8A:
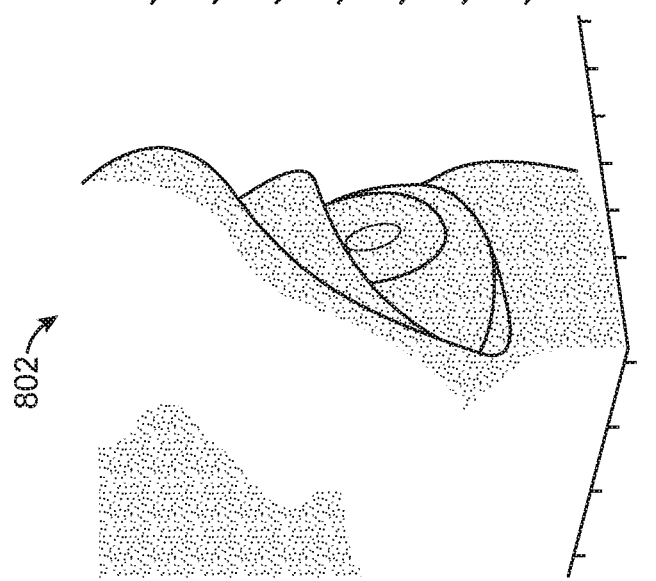

FIGS. 8A-8C illustrate depth maps 802-806 constructed based on interferometric light patterns detected by the imaging device 320, according to various embodiments. As discussed above, the controller 350 receives signals from the imaging device 320 of detected interferometric light patterns projected onto the eye by the structured light generator 310. The controller 350 generates one or more depth maps of the eye based on the received signals. The depth maps shown in FIGS. 8A-8C are examples of such depth maps. The depth map provides depth values for various features of the eye off of which the interferometric light pattern reflects. The features may include a pupil, an iris and a sclera, a conjunctiva, a corner of an eye, an eye lid, the skin around the eye area, etc.

Eye Tracking Based on Depth Maps of the Eye

The controller 350 or console 110 may generate a model of an eye of a user based on the depth values captured in the depth maps. In one embodiment, depth values associated with various features of the eye, such as the pupil, the iris, the sclera, the conjunctiva, the corner of an eye, the eye lid, the eye lash, etc., may be inputted into a machine learning model. Based on the depth values of the various eye features, the machine learning model may produce a model of a user's eye. The eye tracking system 145 may use the generated model of the user's eye for eye tracking. In particular, the structured light eye tracking system 300 may implement the generated model of the user's eye to determine a direction of a user's gaze and/or perform other eye tracking functions. Accordingly, the disclosed techniques provide more user-specific eye tracking, thereby improving the precision and reliability of eye tracking.

Figure 9:
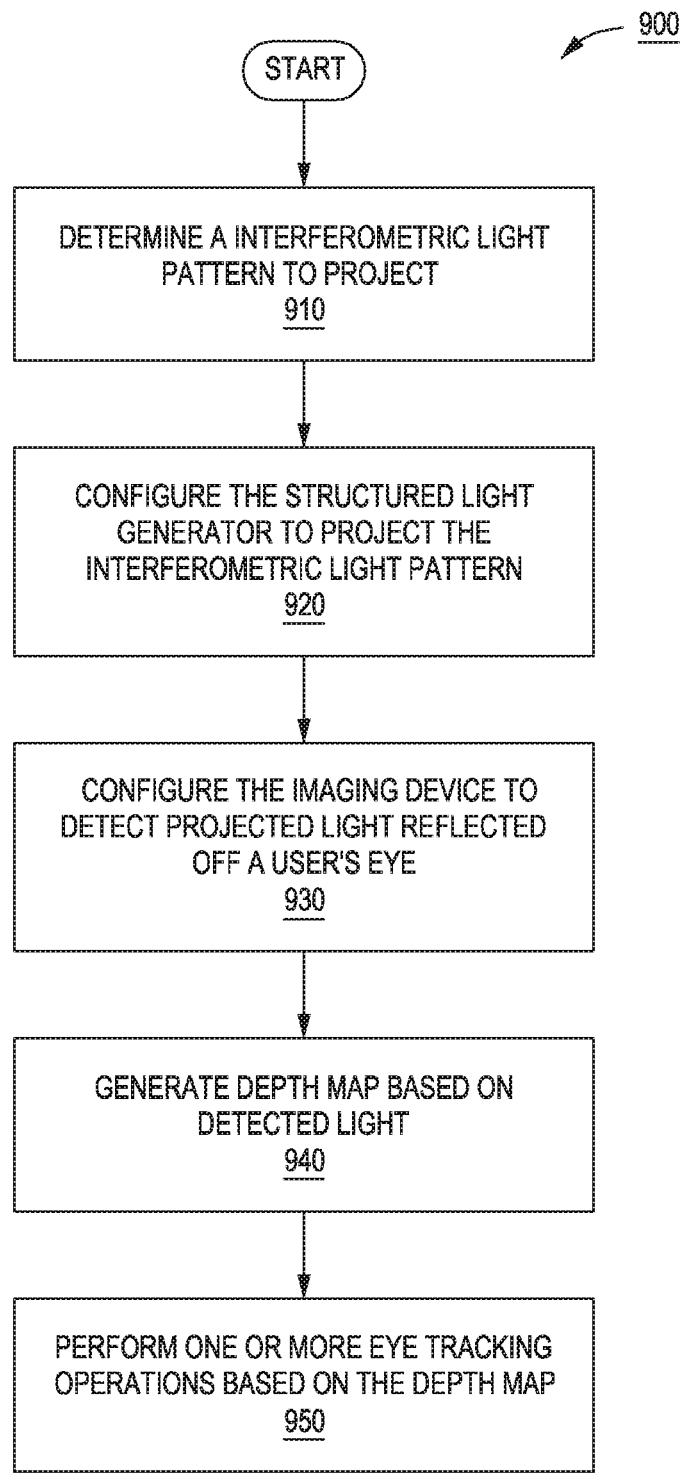
FIG. 9 is a flow diagram of method steps for implementing eye tracking with structured light eye tracking system, in accordance with various embodiments.

FIG. 9 is a flow diagram of method steps for implementing eye tracking with structured light eye tracking system 300, in accordance with various embodiments. Although the method steps are described with reference to the systems of FIGS. 1-8C, persons skilled in the art will understand that any system configured to implement the method steps, in any order, falls within the scope of the present disclosure.

As shown, a method 900 begins at step 910, where the structured light eye tracking system 300 determines one or more interferometric light patterns to project. For example, the structured light eye tracking system 300 may select an interferometric light pattern with an increasing and/or decreasing spatial frequency. At step 920, the structured light eye tracking system 300 configures the structured light generator 310 to project the selected interferometric light pattern on the eye. In some embodiments, the controller 414 in the structured light generator 310 causes the voltage source 406 to drive the spatial light modulator 402 in order to adjust the position and/or orientation of the grating ribbons 410. In particular, the controller 414 may control one or more parameters of an interferometric light pattern projected by the structured light generator 310 by controlling the position and/or orientation of the grating ribbons 410. These parameters may include an amplitude and/or phase shift of the generated interferometric light pattern and a spatial frequency of the interferometric light pattern.

At step 930, the structured light eye tracking system 300 configures the imaging device 320 to detect light reflected off of a user's eye. The imaging device 320 may include light sensitive pixel based detectors that converts detected light into a signal that is analyzed by the structured light eye tracking system 300. At step 940, the structured light eye tracking system 300 generates one or more depth maps based on light detected by the imaging device 320. The depth map may indicate a location of one or more features of a user's eye. The features may include a pupil, an iris and a sclera, a conjunctiva, a corner of an eye, an eye lid, skin area around the eye, etc. The structured light eye tracking system 300 may input a depth for one or more features of a user's eye into a machine learning model to generate a model of a user's eye. At step 940, the structured light eye tracking system 300 performs one or more eye tracking operations (e.g., to determine a direction of a user's gaze) based on the generated depth map of the user's eye.

In sum, the structured light eye tracking system includes a spatial light modulator that projects an interferometric light pattern on an eye of a user. In addition, the structured light eye tracking system includes one or more imaging devices to detect light reflected off of the user's eye. The structured light eye tracking system performs various signal processing techniques based on the phase-shifted structured illuminations to reconstruct the phase profile of the eye area in order and compute a depth map that indicates a depth of one or more features of a user's eye. The structured light eye tracking system may perform eye tracking operations based on the depth map of the user's eye.

Advantageously, the structured light eye tracking system is light weight, has a small form factor, and a low energy requirement. Accordingly, the structured light eye tracking system projector may be easily integrated into the NED. In addition, the structured light eye tracking system enables high granularity imaging of the surface of a user's eye. Accordingly, the structured light eye tracking system may resolve depths of one or more features of a user's eye, such as a pupil, sclera and iris, conjunctiva, and so forth. In particular, the structured light eye tracking system may implement the resolved feature depths to generate a user-specific model of an eye. By implementing the user-specific model, the eye tracking operations performed by the structured light eye tracking system may be performed with a high reliability factor.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

1. In some embodiments, a near-eye display (NED) system comprises a structured light generator including a plurality of reflective surfaces and configured to project one or more structured light patterns into an eye region of the near-eye display device, the one or more structured light patterns generated based on at least one diffraction grating created by displacing at least a subset of the plurality of reflective surfaces, an image capture device configured to capture one or more images of the one or more structured light patterns incident on an eye proximate to the eye region, and a depth mapping controller configured to generate a depth map of the eye based on the captured one or more images.

2. The near-eye display device of clause 1, wherein the structured light generator includes an illumination source configured to emit at least one optical beam incident on the plurality of reflective surfaces.

3. The near-eye display device of clause 1 or 2, wherein the plurality of reflective surfaces diffract the at least one optical beam to generate the one or more structured light patterns.

4. The near-eye display device of any of clauses 1-3, wherein, in a given time period, the one or more structured light patterns projected into the eye region is phase modulated according to a pre-determined phase shift.

5. The near-eye display device of any of clauses 1-4, wherein, subsequent to projecting a first structured light pattern into the eye region at a first point in time in the given time period, the structured light generator projects a second structured light pattern into the eye region, the second structured light pattern being phase modulated from the first structured light pattern according to the pre-determined phase shift.

6. The near-eye display device of any of clauses 1-5, wherein each of the one or more images capture the one or more structured light patterns projected into the eye region at different points in time in the given time period.

7. The near-eye display device of any of clauses 1-6, wherein the image capture device comprises a plurality of pixels that each captures an intensity of light emanating from a location on the eye.

8. The near-eye display device of any of clauses 1-7, wherein the depth map of the eye identifies depths from the image capture device to a plurality of locations on the eye emanating light that is captured by the plurality of pixels.

9. The near-eye display device of any of clauses 1-8, wherein the depth mapping controller is configured to generate the depth map of the eye by, for each pixel in the plurality of pixels, determining, from each of the one or more images, an intensity of light emanating from a first location on the eye and captured by the pixel, determining a spatial phase shift of light captured by the pixel based on the determined intensities, and determining a depth from the imaging device to the first location based on the determined spatial phase shift and a physical distance between the illumination source and the imaging device.

10. The near-eye display device of any of clauses 1-9, further comprising an eye tracking system configured to determine an orientation of the eye based on the depth map.

11. The near-eye display device of any of clauses 1-10, wherein the one or more structured light patterns comprise a moving fringe pattern projected, wherein the rate of projection of the moving fringe pattern is controlled to cause the image capture device to perceive the moving fringe pattern as stationary.

12. A structured light generator, comprising a plurality of reflective surfaces configured to displace in at least one direction, and an illumination source configured to emit at least one optical beam incident on the plurality of reflective surfaces, wherein the optical beam incident on the plurality of reflective surfaces is diffracted to generate a structured light pattern, and wherein one or more images of the structured light pattern projected onto an object are captured to generate a depth map of the object.

13. The structured light generator of clause 12, wherein, when the plurality of reflective surfaces is in an on state, a subset of the plurality of reflective surfaces is displaced by a grating depth.

14. The structured light generator of clause 12 or 13, wherein the structured light pattern is associated with a spatial frequency corresponding to the grating depth.

15. The structured light generator of any of clauses 12-14, wherein the subset of the plurality of reflective surfaces comprises alternate reflective surfaces in the plurality of reflective surfaces.

16. The structured light generator of any of clauses 12-15, wherein, when the plurality of reflective surfaces is in an on state, the plurality of reflective surfaces create a square diffraction grating for diffracting the optical beam.

17. The structured light generator of any of clauses 12-16, wherein one or more intensity peaks in the structured light pattern correspond to a width of a reflective surface in the plurality of reflective surfaces.

18. The structured light generator of any of clauses 12-17, further comprising a voltage source configured to generate a driving voltage that causes the plurality of reflective surfaces to transition from an off state to an on state.

19. The structured light generator of any of clauses 12-18, wherein the structured light pattern is associated with a phase shift corresponding to the driving voltage.

20. The structured light generator of any of clauses 12-19, wherein the driving voltage induces a voltage potential between the plurality of reflective surfaces and a substrate disposed below the plurality of reflective surfaces, the voltage potential causing the subset of the plurality of reflective surfaces to be displaced.

21. The structured light generator of any of clauses 12-20, wherein, when the plurality of reflective surfaces is an off state, the plurality of reflective surfaces reflect any light incident on the plurality of reflective surfaces.

22. The structured light generator of any of clauses 12-21, further comprising a projector configured to project the structured light pattern onto the object.

23. The structured light generator of any of clauses 12-22, wherein the depth map indicates an orientation of the object.

24. A method comprising driving a plurality of reflective surfaces with a driving voltage to create a diffraction grating, emitting light onto the driven plurality of reflective surfaces to generate a structured light pattern corresponding to the diffraction grating, projecting the structured light pattern onto an object, capturing one or more images of the structured light pattern projected onto the object, and generating a depth map of the object based on the one or more images.

25. The method of clause 24, further comprising determining an orientation of the object based on the depth map.

Any and all combinations of any of the claim elements recited in any of the claims and/or any elements described in this application, in any fashion, fall within the contemplated scope of the present invention and protection.

ADDITIONAL CONFIGURATION INFORMATION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the FIG.s illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIG.s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A near-eye display system, comprising:
    a structured light generator including a plurality of reflective surfaces and configured to project one or more structured light patterns into an eye region of the near-eye display device, the one or more structured light patterns generated based on at least one diffraction grating created by displacing at least a subset of the plurality of reflective surfaces;
    an image capture device configured to capture one or more images of the one or more structured light patterns incident on an eye proximate to the eye region; and
    a depth mapping controller configured to generate a depth map of the eye based on the captured one or more images.

2. The near-eye display device of claim 1, wherein the structured light generator includes an illumination source configured to emit at least one optical beam incident on the plurality of reflective surfaces.

3. The near-eye display device of claim 2, wherein the plurality of reflective surfaces diffract the at least one optical beam to generate the one or more structured light patterns.

4. The near-eye display device of claim 1, wherein, in a given time period, the one or more structured light patterns projected into the eye region is phase modulated according to a pre-determined phase shift.

5. The near-eye display device of claim 4, wherein, subsequent to projecting a first structured light pattern into the eye region at a first point in time in the given time period, the structured light generator projects a second structured light pattern into the eye region, the second structured light pattern being phase modulated from the first structured light pattern according to the pre-determined phase shift.

6. The near-eye display device of claim 4, wherein each of the one or more images capture the one or more structured light patterns projected into the eye region at different points in time in the given time period.

7. The near-eye display device of claim 1, wherein the image capture device comprises a plurality of pixels that each captures an intensity of light emanating from a location on the eye.

8. The near-eye display device of claim 7, wherein the depth map of the eye identifies depths from the image capture device to a plurality of locations on the eye emanating light that is captured by the plurality of pixels.

9. The near-eye display device of claim 7, wherein the depth mapping controller is configured to generate the depth map of the eye by, for each pixel in the plurality of pixels,
    determining, from each of the one or more images, an intensity of light emanating from a first location on the eye and captured by the pixel;
    determining a spatial phase shift of light captured by the pixel based on the determined intensities; and
    determining a depth from the image capture device to the first location based on the determined spatial phase shift and a physical distance between an illumination source and the image capture device.

10. The near-eye display device of claim 1, further comprising an eye tracking system configured to determine an orientation of the eye based on the depth map.

11. The near-eye display device of claim 1, wherein the one or more structured light patterns comprise a projected moving fringe pattern, wherein a rate of projection of the moving fringe pattern is controlled to cause the image capture device to perceive the moving fringe pattern as stationary.

12. A structured light generator, comprising:
    a plurality of reflective surfaces configured to displace in at least one direction; and
    an illumination source configured to emit at least one optical beam incident on the plurality of reflective surfaces,
    wherein the at least one optical beam incident on the plurality of reflective surfaces is diffracted to generate a structured light pattern, and
    wherein one or more images of the structured light pattern projected onto an object are captured to generate a depth map of the object.

13. The structured light generator of claim 12, wherein, when the plurality of reflective surfaces is in an on state, a subset of the plurality of reflective surfaces is displaced by a grating depth.

14. The structured light generator of claim 13, wherein the structured light pattern is associated with a spatial frequency corresponding to the grating depth.

15. The structured light generator of claim 13, wherein the subset of the plurality of reflective surfaces comprises alternate reflective surfaces in the plurality of reflective surfaces.

16. The structured light generator of claim 12, wherein, when the plurality of reflective surfaces is in an on state, the plurality of reflective surfaces create a square diffraction grating for diffracting the at least one optical beam.

17. The structured light generator of claim 12, wherein one or more intensity peaks in the structured light pattern correspond to a width of a reflective surface in the plurality of reflective surfaces.

18. The structured light generator of claim 12, further comprising a voltage source configured to generate a driving voltage that causes the plurality of reflective surfaces to transition from an off state to an on state.

19. The structured light generator of claim 18, wherein the structured light pattern is associated with a phase shift corresponding to the driving voltage.

20. The structured light generator of claim 18, wherein the driving voltage induces a voltage potential between the plurality of reflective surfaces and a substrate disposed below the plurality of reflective surfaces, the voltage potential causing the subset of the plurality of reflective surfaces to be displaced.

21. The structured light generator of claim 12, wherein, when the plurality of reflective surfaces is an off state, the plurality of reflective surfaces reflect any light incident on the plurality of reflective surfaces.

22. The structured light generator of claim 12, further comprising a projector configured to project the structured light pattern onto the object.

23. The structured light generator of claim 12, wherein the depth map indicates an orientation of the object.

24. A method comprising:
- driving a plurality of reflective surfaces with a driving voltage to create a diffraction grating;
- emitting light onto the driven plurality of reflective surfaces to generate a structured light pattern corresponding to the diffraction grating;
- projecting the structured light pattern onto an object;
- capturing one or more images of the structured light pattern projected onto the object; and
- generating a depth map of the object based on the one or more images.

25. The method of claim 24, further comprising determining an orientation of the object based on the depth map.

* * * * *